United States Patent Office 3,371,009
Patented Feb. 27, 1968

3,371,009
AROMATIC POLYIMIDE LAMINATES AND METHODS OF PRODUCING SUCH LAMINATES
Edward J. Traynor, Jr., Monroeville, and Russell M. Luck, Pittsburgh, Pa., assignors to Westinghouse Electric Corporation, East Pittsburgh, Pa., a corporation of Pennsylvania
Filed Aug. 28, 1963, Ser. No. 305,106
14 Claims. (Cl. 161—227)

ABSTRACT OF THE DISCLOSURE

Aromatic polymide and amide modified aromatic polymides are theoretically essentially linear high molecular weight molecules. No melting point has been found for these polymers below the temperature range in which decomposition occurs. The polymers do, however, have a determinable glass transition point. Laminated articles may be prepared from fibrous reinforcing sheets impregnated with these polymers, after the impregnant is fully cured, by heating and pressing multiple plies of such sheet material at a temperature above the glass transition point of the polymer. Polymers having a relatively low glass transition point can be employed as a thin film over sheets impregnated with polymers having a higher glass transition point.

---

The present invention relates to a novel class of reinforced resinous laminates. The novel laminates include flat articles and tubular members characterized by outstanding physical and improved electrical insulating properties. They are further characterized by their ability to retain these improved properties for extended periods of time at elevated temperatures. The invention includes both the novel laminates themselves and the method of their preparation.

The trend toward high operating temperatures in the electrical and missile fields has stimulated much activity in the development of heat resistant organic resins and insulating laminates containing them. Up to the present time, two resin systems, the phenolic resin and the silicone resin systems have been widely employed. The phenolic resin laminate system possesses good physical and electrical properties at temperatures up to 250° C. for relatively long periods of time. The silicone resin laminate system has only fair physical properties, but retains good electrical properties for extended periods at elevated temperatures.

It has been recognized that, among organic compounds, those possessing an aromatic ring structure are outstanding in resistance to thermal degradation. Recently there has been developed a class of polymers containing benzene nuclei linked by reaction between a dicarboxylic acid and/or derivatives thereof and a diamine. These materials are termed "aromatic polyamides." When a suitable dianhydride is substituted for the acid of the resin system, linear polyimides are produced. Even more recently, copolymers comprised of mixtures of amide and imide linkages have been prepared. These copolymers have been termed "linear amide-modified polyimides." The present invention is concerned with the use of both of these latter two classes of resinous compositions in the preparation of electrical grade laminates.

It is therefore a primary object of the present invention to provide electrical grade laminates including both tubular and flat members characterized by outstanding thermal stability and improved physical properties at elevated temperatures.

Another object of the invention resides in the provision of improved laminates containing, as the resinous component, a class of linear polyimides and amide-modified polyimides.

A further object of the invention resides in the novel process of preparing the improved electrical grade laminates.

Figure 1:
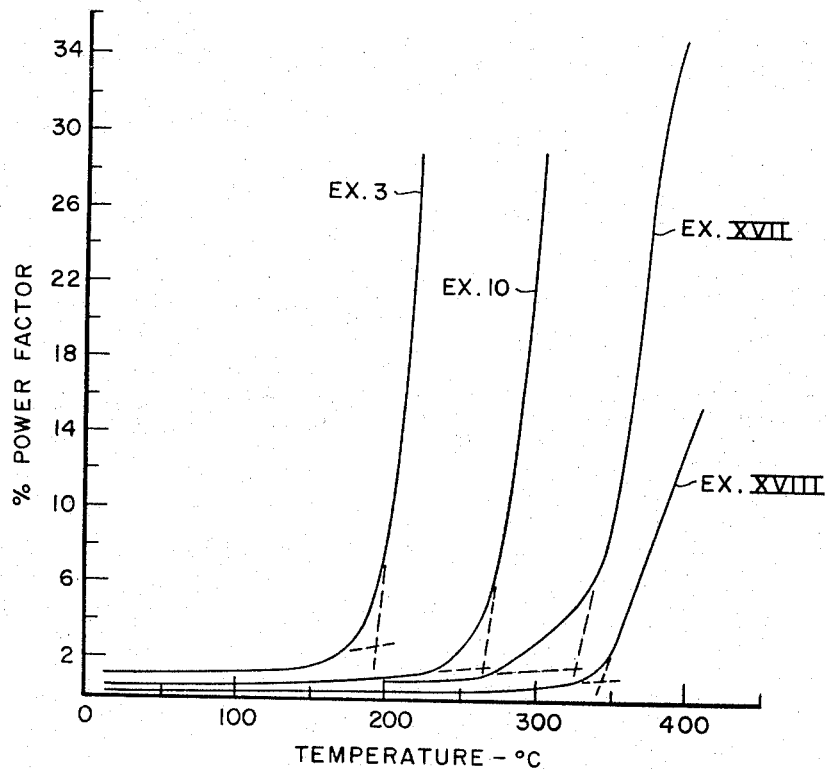
Figure 2:
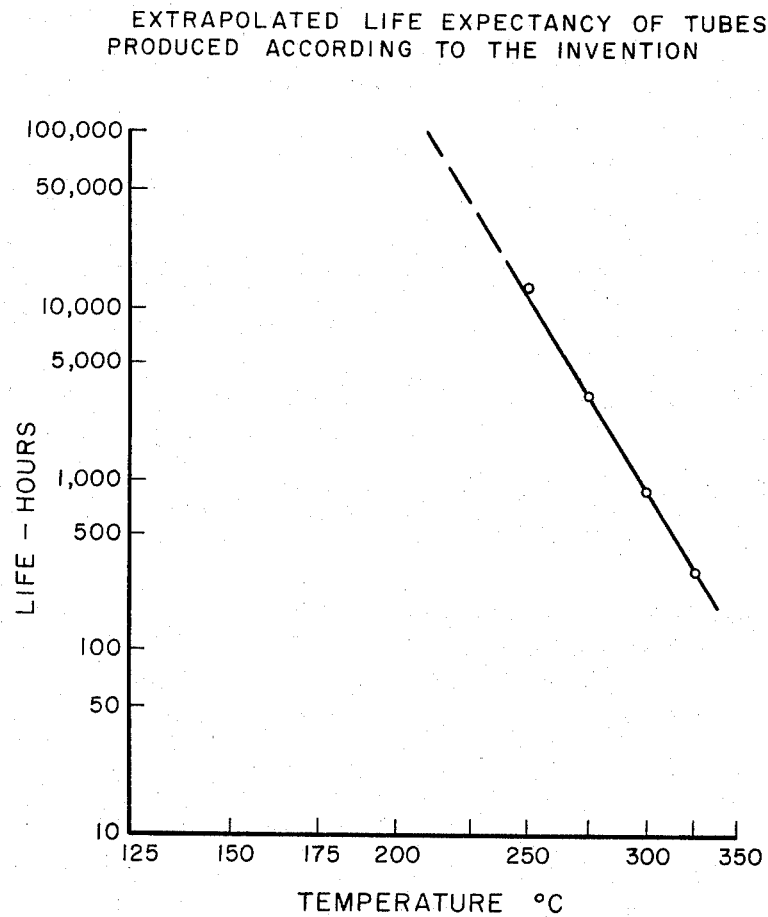

For a more complete understanding of the present invention, reference is made to the following detailed description taken in conjunction with the accompanying drawing, wherein:

FIGURE 1 is a chart setting forth typical dissipation values for some of the resinous compositions which may be employed in the invention, and FIG. 2 is a chart illustrating the life expectancy, at various temperatures, of tubes prepared according to the invention.

In general, the novel electrical grade laminates of the invention employ linear polyimides and linear amide-modified polyimides containing the repeating unit:

$$\left[ \begin{array}{c} \phantom{x} \\ -N \\ \phantom{x} \end{array} \begin{array}{c} CO \\ \diagup \\ \diagdown \\ CO \end{array} R' \begin{array}{c} CO \\ \diagdown \\ \diagup \\ CO \end{array} N-R- \right]$$

in which R is selected from the following group:

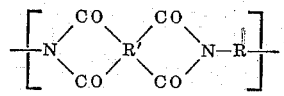

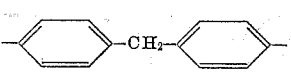

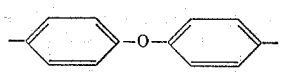

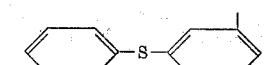

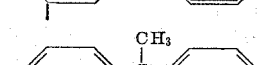

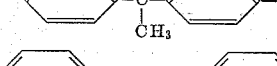

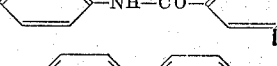

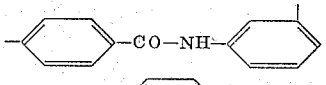

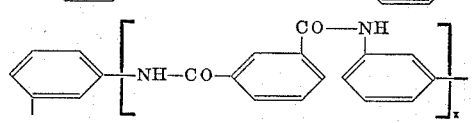

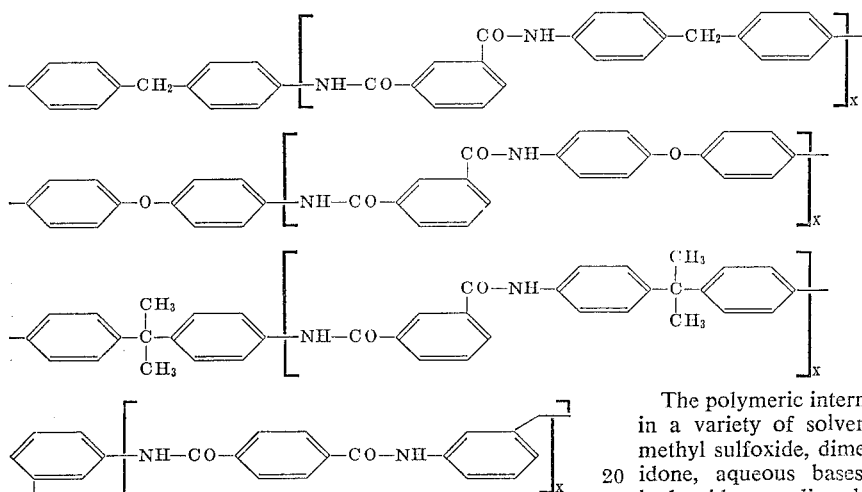

in which X represents an integer of from 1 to 500 and in which R′ represents a tetravalent radical selected from the group consisting of

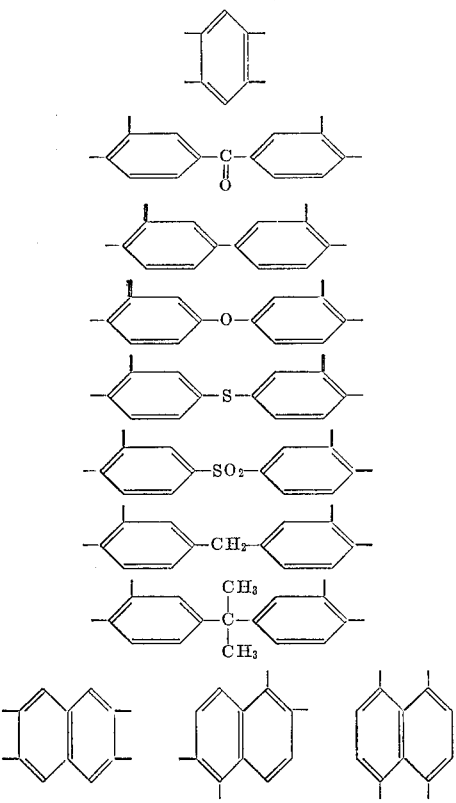

In the finally cured laminates, the resinous components are insoluble in most solvents. However, by the particular method of preparing the resins, intermediates of the final polymers and copolymers are formed and these are soluble in certain useful solvents. In the intermediates, part or all of the ultimate imide groups are in the form of amido acids, which on further heating, condense as follows:

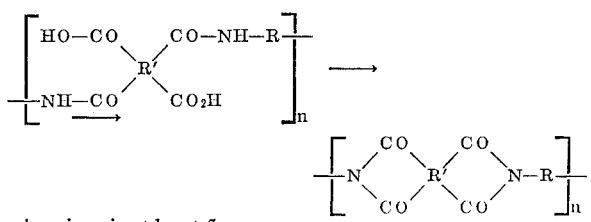

wherein $n$ is at least 5.

The polymeric intermediates of the invention are soluble in a variety of solvents such as dimethylacetamide, dimethyl sulfoxide, dimethylformamide, N-methyl-2-pyrrolidone, aqueous bases such as sodium or ammonium hydroxide or sodium bicarbonate. Such intermediate solutions are employed in the preparation of the novel laminates of the invention.

The diamino amides and polyamides listed hereinbefore can be prepared in a variety of ways. For example, one or more aromatic diamines selected from the group consisting of m-phenylene diamine, p,p′-diamino diphenyl methane, p,p′-diamino diphenyl ether, p,p′-diamino diphenyl sulfide, p-phenylene diamine and the like diamines can be reacted with one or more aromatic diacyl halides, such as isophthaloyl or terephthaloyl chloride. The molar ratio of diamine to diacyl halide can be varied from slightly more than one to a very large excess, depending upon the type of intermediate desired. With a large excess of diamine, the product will tend to be largely of low molecular weight containing two to three amide linkages per molecule. As the ratio of reactants approaches one, the number of amide linkages per molecule increases, so that the value of X in the formulas shown can reach a high value. In this way the ratio of amide to imide groups in the final polymer can be conveniently controlled.

A second method of preparation is the reaction of an aromatic nitro acyl halide, such as a nitro benzoyl chloride, with an aromatic nitro amine, such as a nitroaniline, followed by reduction of the resulting dinitro amide to a diamino amide. This method gives compounds containing one amide group and two amino groups.

A third method is the reaction of an aromatic nitro amine with an aromatic diacyl halide, followed by reduction, to give diamines containing two amide linkages per molecule. Alternately, an aromatic diamine can be reacted with an aromatic nitro acyl halide to give a dinitro product, which is reduced to a diamine containing two amide linkages per molecule.

It will be obvious to those skilled in the art that other intermediate compounds can be employed in the preparation of the aromatic diamino amides, and that combinations of the methods can be used advantageously in some cases.

A second general method of preparation of the amide-imide copolymers employed in this invention comprises initial reaction between a suitable aromatic dianhydride and a molar excess of an aromatic diamine to give an amine-terminated linear polymer containing amide acid linkages. The molecular weight of this intermediate can be controlled by varying the molar ratio of diamine to dianhydride. In a second step, the amine-terminated polyamide acid is reacted with an aromatic diacyl halide to give a soluble high polymer containing amide links as well as amide acid links. Dehydration by heat or chemical means converts the latter to imide links and gives a substantially insoluble product. The aromatic polyimides and amide-modified polyimides are, at least in theory, linear molecules of high molecular weight and are free of cross links. They should be thermoplastic although no melting point has been found for any of them below the temperature range in which decomposition occurs. However, that they are inherently thermoplastic is evident from the fact that the cured materials tend to creep under heavy loads at elevated temperatures. It has been found that these polymers have properties somewhat similar to other well-known polymers which go from the glass, or rigid, region to an intermediate rubbery condition rather abruptly. This is termed the glass transition point ($T_g$) and the phenomenon has been found to be of special benefit in the present invention.

The glass transition points of the polymers which are employed herein are determinable by electrical measurement, particularly dissipation factor. As will be seen in FIGURE 1, the dissipation factor of the polymers rises abruptly, as a result of temperature rise. Extrapolation of the two flat portions of each curve to the point of intersection gives a surprisingly accurate determination of each $T_g$. From these determinations it has been found that successful prediction can be made of the temperature range at which the polymers can be made to flow sufficiently to permit the preparation of laminates therefrom. This discovery is one of the critical features of the invention.

It has also been discovered that those polymers containing a molar proportion of at least one amide group to one imide group are more thermoplastic than the unmodified polyimides or those amide-imide copolymers containing a molar excess of imide groups. Consequently, in the preparation of laminates from the novel polymers, certain critical techniques have been developed in order to benefit from the diverse characteristics of the resins.

For example, in the case of one particular resin containing an amide-imide molar ratio of 1:2, laminates may be produced at a temperature of about 300° C. However, employing this resin as an impregnating material and applying to the dead-cured resin a thin film of a second polymer having a lower $T_g$, laminates may be prepared at appreciably lower temperatures than when using the first resin alone. This feature is of special benefit when producing tubular articles where relatively low laminating pressures are employed. It will be appreciated that the term "laminating" in the present invention embraces the production of both tubular and flat laminates.

Moreover, in the manufacture of, for example, tubes for electrical purposes, the curing of the impregnating resin provides distinct advantages over the prior art procedures. When solvent is driven off, tiny voids are left in the impregnated material and, in previous practice, these voids were present in the finished tubes and contributed greatly to rapid deterioration of its electrical properties. In the present invention these voids, or pinholes, are filled by the thin adhesive coating and the finished tube is substantially free therefrom. Accordingly, the electrical properties of the articles are maintained for long periods of time at their initial high level.

In general the $T_g$ values, or points, of the resinous compositions employed in the invention will lie within the range of about 175° C. to about 400° C. Obviously, as the $T_g$ values of the resinous compositions become increasingly higher it is requisite that laminates prepared therefrom are produced under higher pressing temperatures. This is particularly true when the resins are "dead cured," or "fully cured," i.e. cured to the state where they have apparently become infusible. In some instances, as will become apparent hereinafter, laminates having very desirable properties may be prepared by employing combinations of resins having quite high $T_g$ values or by high $T_g$ value compositions employed singly. It is also notable that if the resin impregnated laminae are not first dead cured, laminating conditions may well be less severe. Such materials may be laminated at, for example, 100–150 p.s.i. Therefore, the overall pressure range required in preparing laminates from these resins extends from about 100 p.s.i. to 2,000 p.s.i. or higher.

Materials suitable for resin impregnation and lamination according to the invention include electrical grade glass fabric such as No. 116 weave glass fabric and heavier grades such as, for example, No. 181 weave, glass sheets prepared from parallel glass fibers, polyamide fibers and paper prepared therefrom, asbestos fibers and sheets prepared therefrom, and like fibrous sheet materials.

The following specific examples will point out with even more particularity the advantages to be derived from the invention. It is to be understood, however, that the examples are presented for purposes of illustration only.

*Example I*

A solution of 32.4 grams of m-phenylene diamine, 33.3 grams of triethylamine and 400 grams of dimethyl acetamide was stirred while 30.5 grams of isophthyloyl chloride were added slowly. The reaction temperature reached 64° C. spontaneously. The mixture then was cooled and filtered to remove the precipitate of triethylamine hydrochloride. The filtrate was diluted to a total weight of 531 grams with dimethyl acetamide. The solution was stirred while pyromellitic dianhydride was added slowly. A maximum viscosity of 11.5 stokes was reached when 31.8 grams of the dianhydride had been added. The amide-imide molar ratio was 1:1, and its $T_g$ was 225°–250° C.

*Example II*

The method of Example I was repeated using 43.2 grams of m-phenylene diamine, 79 grams of triethylamine, 400 grams of dimethyl acetamide and 72.1 grams of isophthaloyl chloride in the first step. After dilution to 650 grams with dimethyl acetamide, a total of 10.35 grams pyromellitic dianhydride was added, giving a product having a maximum viscosity of 3.1 stokes. The amide-imide molar ratio was 8:1.

*Example III*

A solution of 34.6 grams of m-phenylene diamine in 400 grams of dimethyl acetamide together with 53.5 grams of anhydrous sodium carbonate was stirred while a mixture of 36.5 grams of isophthaloyl chloride and 12.2 grams of terephthaloyl chloride was added slowly. Stirring was continued for two more hours. The mixture was filtered and the filtrate was stirred while a total of 19.8 grams of pyromellitic dianhydride was added thereto. A maximum viscosity of 0.5 stoke was reached. The amide-imide molar ratio was 3:1.

The resin so-prepared was used to impregnate heat cleaned glass cloth to a resin content of 30–50%. Three to four separate applications of resin were made with each film of resin thoroughly cured at 200° C. prior to the addition of the succeeding coat. A final very thin film of the resin was then applied and undercured to non-tacky state.

Tubes were prepared from the resin-impregnated glass cloth by wrapping the fabric around a mandrel heated to 200° C. The tubes were wrapped so as to provide wall thickness of 1/32" and 1/16". The electric strength of the tubes was measured at room temperature and then at various intervals throughout an aging period at various temperatures. The tubes were tested at intervals at room temperature. Failure of the tubes was arbitrarily set at 250 volts per mil and testing was discontinued at this point. FIGURE 2 sets forth this data in terms of extrapolated useful life at various temperatures. It will be seen that, at 200° C., the probable life is approximately 100,000 hours.

*Example IV*

A solution of 34.6 grams of m-phenylene diamine, 300 grams of dimethyl acetamide and 49 grams of triethylamine was stirred while a solution of 36.5 grams of isophthaloyl chloride, 12.2 grams of terephthaloyl chloride and 100 grams of xylene was added thereto over a period of 10 minutes while the temperature was held at 35–40° C. with a cooling coil. The mixture was filtered and the filtrate was diluted to 530 grams with dimethyl acetamide. Pyromellitic dianhydride was added to this solution in small increments, with continued stirring until 17.95 grams had been added and a viscosity of 12.0 stokes had been reached. The solution was diluted with 33 grams of xylene giving a clear amber solution containing 15% solids in a 3:1 dimethyl acetamide-xylene mixture. The amide-imide molar ratio was 3:1.

*Example V*

Two mols of m-nitroaniline were dissolved in an acetic acid-water solution together with two mols of sodium hydroxide. With vigorous stirring, there was added to the solution one mol of isophthaloyl chloride dissolved in xylene. The precipitate which formed was filtered and washed successively with dilute aqueous sodium hydroxide, dilute aqueous hydrochloric acid, and with water. A 90% yield of isophthaloyl-m-nitroanilide was obtained after drying for 24 hours at 150° C. The isophthaloyl-m-nitroanilide then was hydrogenated to isophthalolyl-m-amino-anilide in 82% yield using a Raney nickel catalyst. The reduction was effected in the presence of a solvent composed of 1 part γ-butyrolactone and 10 parts ethanol. 74 grams of isophthaloyl-m-amino-anilide was then dissolved in 372 grams of dimethyl acetamide. To this was added 44.5 grams of pyrromellitic dianhydride. Total addition time was approximately one hour. The solution was diluted by the addition of 124 grams of dimethyl acetamide. Increments of pyromellitic dianhydride and dimethyl acetamide were added and the viscosity measured as shown in Table I below:

TABLE I

| Total PMDA¹ (g.) | Total DMA² | Viscosity, Stokes |
| --- | --- | --- |
| 47 | 496 | 10 |
| 47.3 | 565 | 9 |
| 47.6 | 650 | 10 |
| 47.9 | 650 | 10 |

¹ Pyromellitic dianhydride.
² Dimethyl acetamide.

*Example VI*

One mol of m-phenylene diamine was dissolved in water with two mols of sodium hydroxide. While stirring vigorously, there was added to the solution two mols of m-nitrobenzoyl chloride. The resulting N,N'-bis (m-nitrobenzoyl)-m-phenylene diamine was washed with dilute aqueous sodium hydroxide, dilute aqueous hydrochloric acid, and water and then dried at 150° C. The product was obtained in 90% yield.

The N,N'-bis (m-nitrobenzyl)-m-phenylene diamine was hydrogenated to N,N'-bis (m-aminobenzoyl)-m-phenylene diamine with a Raney nickel catalyst to give a 69% yield. The hydrogenation solvent was composed of 3 parts of γ-butyrolactone and 20 parts ethanol.

34.6 grams of N,N'-bis(m-aminobenzoyl)-m-phenylene diamine was dissolved in 170 grams of dimethyl acetamide. A total of 19.5 grams of pyromellitic dianhydride was added initially over a 10 minute period. Additional increments of the dianhydride were added at 15 minute intervals. The total amount of dianhydride and the viscosity of the resulting solutions are set forth in Table II below:

TABLE II

| Total PMDA¹ (g.): | Viscosity (Stokes) |
| --- | --- |
| 19.5 | 2.5 |
| 20.0 | 4.3 |
| 20.5 | 9.7 |
| 20.7 | 14 |
| 20.8 | 19 |

¹ Pyromellitic dianhydride.

*Example VII*

One mol of p,p'-diaminophenyl ether and two mols of sodium hydroxide were dissolved in an acetic acid-water solvent. To this solution was added with vigorous stirring two mols of m-nitrobenzoyl chloride dissolved in xylene. The solid material which separated was filtered off and then washed successively with dilute aqueous sodium hydroxide, dilute aqueous hydrochloric acid, and with water. After drying at 150° C. the product, bis (m-nitrobenzoyl)-p,p'-diaminophenyl ether, was obtained in a yield of 93%. This material then was hydrogenated to give a yield of 76% of bis (m-aminobenzoyl)-p,p'-diaminophenyl ether using 5% platinum-on-charcoal as a catalyst. 4.4 grams of the product so obtained then was dissolved in 21 grams of dimethyl acetamide. To this there was added 2.2 grams of pyromellitic dianhydride with stirring. The solution became quite viscous so 70 grams of dimethyl acetamide was added. The amide-imide molar ratio was 1:1.

*Example VIII*

A mixture of 86.5 grams of m-phenylene diamine, 255 grams of anhydrous sodium carbonate, and 400 grams of dimethyl acetamide was stirred rapidly while a solution of 91.4 grams of isophthaloyl chloride, 30.5 grams of terephthaloyl chloride and 200 grams of xylene was added slowly. The mixture was cooled during the addition to keep the temperature below 45° C. After stirring for two hours, the mixture was filtered, diluted with 1240 grams of dimethyl acetamide, stirred for thirty minutes with fresh sodium carbonate and then filtered again.

The filtrate thus obtained was divided into two equal parts. One part was stirred rapidly while pyromellitic dianhydride was added in small portions until a total of 22.1 grams had been added and the viscosity had reached 1020 centistokes at 38° C. The other portion of the filtrate was stirred while an equal quantity of pyromellitic dianhydride was added in one portion. Stirring of the second portion was continued until a clear solution was obtained. This then was combined with the first portion to give 1300 grams of a solution having a viscosity of 885 centistokes at 35° C. and a solids content of 15%. The amide-imide molar ratio was 3:1.

*Example IX*

A solution of 54 grams of m-phenylene diamine, 101 grams of triethylamine, and 214 grams of dimethyl acetamide was stirred rapidly with cooling while a solution of 76.1 grams of isophthaloyl chloride, 25.4 grams of terephthaloyl chloride, and 143 grams of xylene was added slowly thereto. The resulting viscous mixture was diluted with an additional 318 grams of dimethyl acetamide and then filtered. A portion of the filtrate containing 48.3% of the total, was stirred rapidly while a total of 1.8 grams of pyromellitic dianhydride was added in small portions. A clear solution was obtained having a 15% solids content and a viscosity of 413 centistokes at 50° C. The amide-imide molar ratio was 28.1.

*Example X*

A solution composed of 138 grams of p-nitroaniline, 85 grams of sodium hydroxide, 1800 milliliters of acetic acid and 1000 milliliters of water was placed in a large Waring blendor. To this solution was added another solution composed of 190 grams of m-nitrobenzoyl chloride dissolved in 800 milliliters of xylene. A copious precipitate formed and more water was added to facilitate stirring. After about five minutes the mixture was filtered and washed with water. The solid precipitate was stirred with an aqueous sodium hydroxide solution, filtered, stirred with an aqueous hydrochloric acid solution, filtered, and finally stirred with warm water. After a final filtration, the solid m-nitrobenzoyl-p-nitroanilide was dried at 100° C. for 16 hours. The average yield of several runs was about 80 to 90%.

A mixture composed of 14 grams of m-nitrobenzoyl-p-nitroanilide, 225 milliliters of ethyl acetate and about 0.3 grams of 5% palladium-on-carbon catalyst was placed in a hydrogenation flask which was attached to a Parr low pressure hydrogenation apparatus. After up-take of hydrogen ceased the hot solution was filtered. The solution was concentrated and the remaining solid material collected by vacuum filtration. The average yield of several runs was 75–85% of m-aminobenzoyl-p-aminoanilide.

A solution composed of 35 grams of the m-aminobenzoyl-p-aminoanilide product thus prepared and 206 grams of dimethyl acetamide was placed in a small Waring blendor. To this solution was added 32 grams of pyrometallic dianhydride over a five-minute period. Eight successive 0.1 gram portions of the dianhydride were added to the solution. After each addition of the dianhydride, the viscosity of the solution increased markedly. No more dianhydride was added after the rate of increase of viscosity appeared to be decreasing. The final amide-imide molar ratio was 1:2.

The resin so prepared was used to impregnate A1100 finished 181 style glass cloth to a resin concentration of 36%. The A1100 finished glass cloth has been heat cleaned, completely saturated with an amine-type vinyl silane and thereafter dried. Two separate applications of the resin were made and each cured at 200° C.

Laminates were fabricated from this material by pressing at 330° C., 2000 p.s.i. for ½ hour. The boards were post-cured from 125° to 300° C. at a programmed rate of rise of 6° C. per hour. On aging at 300° C. for 500 hours, the flexural strength maintained 14,000 p.s.i. when tested at 300° C.

The following examples illustrate the preparation of polypyromellitimides containing mixtures of 2 or more amines.

*Example XI*

To a solution of 72 grams of 4,4'-diaminophenyl ether and 54.5 grams of m-aminobenz-p-aminoanilide in 1450 grams of dimethyl acetamide was added 125 grams of pyromellitic dianhydride. To this thin solution 6.9 grams of pyromellitic dianhydride was added over a period of several hours. After dilution with 115 grams of dimethyl acetamide this solution had a viscosity of Z-3 on the Gardner scale. A tough and flexible film was cast from this solution at 150° C. The amide-imide molar ratio was 1:5.

*Example XII*

To a solution of 108 grams 4,4'-diaminophenyl ether and 13.5 grams of m-aminobenz-p-aminoanilide in 1425 grams of dimethyl acetamide was added 125 grams of pyromellitic dianhydride. To this thin solution 9.5 grams of pyromellitic dianhydride was added over a period of several hours. After dilution with 255 grams of dimethyl acetamide this solution had a viscosity of Z-3 on the Gardner scale. The amide-imide ratio was 1:20.

*Example XIII*

To a solution of 136 grams of m-aminobenz-p-aminoanilide dissolved in 670 grams of dimethyl acetamide was added 166 grams of benzophenone tetracarboxylic dianhydride (BTDA). Over a period of several hours 31 anilide dissolved in 670 grams of dimethyl acetamide were added. This solution had a viscosity of Z-4 on the Gardner scale. The amide-imide molar ratio was 1:2.

*Example XIV*

To a solution composed of 68 grams of m-aminobenz-p-aminoanilide and 60 grams of 4,4'-diaminophenyl ether in 652 grams of dimethyl acetamide was added 166 grams of BTDA. Over a period of several hours 31 grams of BTDA and 700 grams of dimethyl acetamide were added. The resulting solution had a viscosity of Z-4 on the Gardner scale. The amide-imide molar ratio was 1:4.

*Example XV*

To a solution composed of 22.7 grams of m-aminobenz-p-aminoanilide in 150 grams of dimethyl acetamide was added 16.1 grams of BTDA. Over a period of two hours 10.9 grams of PMDA was added. The amide-imide molar ratio was 1:2.

*Example XVI*

To a solution composed of 11.4 grams of m-aminobenz-p-aminoanilide and 10.8 grams of 4,4'-diaminophenyl sulfide in 147 grams of dimethyl acetamide was added 16.1 grams of BTDA. Over a two-our period 10.9 grams of PMDA was added. The amide-imide molar ratio was 1:4.

*Example XVII*

A solution of 135 grams (0.625 moles) of 4,4'-diaminodiphenyl sulfide in 1235 grams of N,N-dimethylacetamide was stirred while 136 grams of PMDA was added rapidly. When solution was complete, additional small increments of PMDA were added until a total of 137.9 grams (0.632 mole) of PMDA had been added and the viscosity of the solution reached Z-Z1 Gardner. The product was a clear orange solution, 18% solids. The $T_g$ point, as illustrated in the figure was about 325° C.

*Example XVIII*

A typical imide polymer using BTDA is prepared as follows: A solution comprised of m-phenylene diamine (MPD) (227 g.=210 moles) and dimethyl acetamide (1500 g.) was stirred in a 5 l. flask. A total of 630 g. of BTDA was added over a 90 minute period at a rate such that the solution temperature remained just below 60° C. At this point the viscosity had reached Z-4 (Gardner scale) and 300 g. of dimethyl acetamide was added followed by four 10 g. portions of BTDA at ten minute intervals. The viscosity rose to Z-5 and another 300 g. of dimethyl acetamide was added followed by two 5 g. portions of BTDA. (Total now 2.11 moles.) Viscosity of the final solution was adjusted to about Z-4 by addition of 300 g. DMAC. Final solids content was 27.4%.

Impregnated 181 style, A1100 finished glass cloth to a resin concentration of 36%. The resin was applied in five applications and each cured out at 225° C.

The laminates were made from this material by first baking out the volatiles from the sheets at 600° F. for 15 minutes. The sheets were then pressed at 2000 p.s.i. and 350° C. for ½ hour. The $T_g$ of this resin is approximately 340° C.

*Example XIX*

Laminates were prepared, employing No. 181–A1100 grade glass cloth as follows:

TABLE III.—FLEXURAL STRENGTH OF LAMINATES RESINS AND PRESSING CONDITIONS EMPLOYED

| | Ex. 17 | Ex. 5 | Ex. 18 | Ex. 17 |
|---|---|---|---|---|
| Resin | | | | |
| Bond Coat | Ex. 5 | None | None | Ex. 10 |
| Press Temp. (° F.) | 550 | 515 | 662 | 590 |
| Resin Content (%) | 40.0 | 37.5 | 36.0 | 33.8 |
| Aging and Test, ° C | 315 | 315 | 315 | 315 |
| Temperature, °F | 600 | 600 | 600 | 600 |

| | Flexural Strength (p.s.i.) | | | |
|---|---|---|---|---|
| Aging Time (Hrs.): | | | | |
| Initial (Rm. T.)* | (24,000) | (33,650) | (65,900) | (20,900) |
| 0.5 | 13,350 | 25,350 | | 11,900 |
| 50 | 11,400 | 21,650 | 34,866 | 14,900 |
| 100 | 12,400 | 24,100 | | 17,000 |
| 250 | 13,250 | 24,950 | 35,700 | 20,100 |
| 500 | 12,050 | 23,950 | 33,900 | 18,550 |
| 750 | 12,350 | 21,600 | | 16,800 |
| 1,000 | 13,050 | 20,600 | | 14,050 |

*24 hours.

From the foregoing description it will be appreciated that the present invention provides greatly improved flat and tubular electrical insulation characterized by outstanding thermal stability. The products may be employed as insulation in electrical and electronic equipment where high operating temperatures are necessary. They may also be used in equipment where outstanding strength retention and low dissipation factor must be maintained at elevated temperatures.

We claim as our invention:

1. A process for preparing a reinforced resinous laminate characterized by improved thermal stability and physical retention at elevated temperatures which comprises, (1) impregnating a fibrous sheet material with a solution of a resinous composition selected from the group consisting of linear aromatic polyimide intermediates and linear aromatic amide-modified polyimide intermediates having a given inherent glass transition point and heating the impregnated sheet material to drive off volatiles and fully cure the resinous material, the resin solids content of the sheet material being about 20–50% by weight of the sheet material and the pilyimide characterized by a glass transition point of about 250°–400° C., (2) applying to the sheet surfaces a coating of a resinous composition solution selected from the group consisting of linear aromatic polyimide intermediates and linear aromatic amide-modified polyimide intermediates possessing an inherent glass transition point value lower than that of the impregnating resinous composition, (3) heating the sheet material to drive off volatiles and fully cure the coating composition and (4) laminating and consolidating the so-treated impregnated and coated sheet material under heat and pressure, at a temperature higher than the glass transition point of the fully cured resinous coating composition.

2. A process for preparing a reinforced resinous laminate characterized by improved thermal stability and physical property retention at elevated temperatures which comprises impregnating a fibrous sheet material with a solution of a resinous composition selected from the group consisting of linear aromatic polyimide intermediates and linear aromatic amide-modified polyimide intermediates and mixtures thereof, the resin content of the impregnated sheet material being about 20–50% by weight of the sheet material based on the resin solids, heating the impregnated sheet to drive off volatiles and fully cure the resinous composition to provide a solid resin that is characterized by a glass transition point within the range of about 175°–400° C., and thereafter laminating and consolidating the heat treated sheets under heat and pressure, at a temperature above the glass transition point of the solid resin.

3. A process as in claim 1 wherein the impregnating resinous composition is the product of reaction of m-aminobenzoyl-p-aminoanilide and pyromellitic dianhydride and the coating resinous composition applied thereover is the product of reaction of m-phenylene diamine, isophthaloyl chloride, and terephthaloyl chloride further reacted with pyromellitic dianhydride.

4. A process as in claim 2 wherein the impregnating resin is the product of reaction of m-aminobenzoyl-p-aminoanilide and pyromellitic dianhydride.

5. A process as in claim 2 wherein the impregnating resin is the product of reaction of m-phenylene diamine and benzophenone tetracarboxylic dianhydride.

6. A process as in claim 2 wherein the impregnating resin is the product of reaction of 4,4'-diaminodiphenyl sulfide and pyromellitic dianhydride.

7. A process as in claim 2 wherein the impregnating resin is the product of reaction of isophthaloyl-m-aminoanilide and pyromellitic dianhydride.

8. A reinforced resinous laminate comprising a plurality of plies of fibrous sheet material impregnated with a linear resinous composition selected from the group consisting of aromatic polyimides and aromatic amide-modified polyimides characterized by a glass transition point of about 250° C. to about 400° C. and bonded together by a linear resinous composition selected from the group consisting of aromatic polyimides and aromatic amide-modified polyimides characterized by a glass transition point of about 175° C. to about 200° C.

9. A process for preparing a reinforced resinous laminate comprising the steps of impregnating a fibrous reinforcing sheet with a solution of a linear aromatic polyimide intermediate derived from an aromatic diamino compound, heating the impregnated sheet to fully cure and convert the intermediate to a solid resin having a given inherent glass transition point, thereafter providing superimposed laminae of said sheet and consolidating the laminae into a unitary structure under heat and pressure at a temperature above said inherent glass transition point but below the melting point of the solid resin.

10. The process of claim 9 wherein said solution is a solution of an aromatic amide-modified polyimide intermediate.

11. The process of claim 10 wherein the reinforcing sheet is a sheet of fiber glass.

12. A reinforced resinous laminate comprising plural plies of a fibrous sheet material having a first coating of a solid fully cured resinous composition and a second coating of a solid fully cured resinous composition bonding said plies together into a unitary structure, said first and second coating resinous compositions being aromatic polyimide resins having an inherent glass transition point, the glass transition point of said second coating being lower than the glass transition point of said first coating.

13. The laminate of claim 12 in which said second coating resinous composition is an aromatic amide-modified polyimide having a glass transition point lower than the glass transition point of said first coating.

14. The laminate of claim 13 in which said first coating resinous composition is an aromatic amide-modified polyimide.

References Cited

UNITED STATES PATENTS

| 2,712,543 | 7/1955 | Gresham et al. | 260—78 |
| 2,944,993 | 7/1960 | Brebner et al. | 161—93 |
| 3,049,518 | 8/1962 | Stephens | 260—78 |
| 3,179,631 | 4/1065 | Endrey | 156—331 X |
| 3,179,633 | 4/1965 | Endrey | 161—227 X |
| 3,179,634 | 4/1965 | Edwards | 161—227 X |
| 3,179,635 | 4/1965 | Frost et al. | 260—78 |

EARL M. BERGERT, *Primary Examiner.*

CLIFTON B. COSBY, *Examiner.*